United States Patent
Higgins

(10) Patent No.: US 7,718,211 B2
(45) Date of Patent: *May 18, 2010

(54) LOW TRANS-STEREOISOMER SHORTENING SYSTEM

(75) Inventor: Neil W. Higgins, Bourbonnais, IL (US)

(73) Assignee: Bunge Oils, Inc., Bradley, IL (US)

( * ) Notice: Subject to any disclaimer, the term of this patent is extended or adjusted under 35 U.S.C. 154(b) by 515 days.

This patent is subject to a terminal disclaimer.

(21) Appl. No.: 11/616,364

(22) Filed: Dec. 27, 2006

(65) Prior Publication Data

US 2007/0172573 A1    Jul. 26, 2007

Related U.S. Application Data

(63) Continuation of application No. 10/352,692, filed on Jan. 28, 2003, now Pat. No. 7,169,430.

(51) Int. Cl.
A23D 9/00 (2006.01)
B01J 23/00 (2006.01)

(52) U.S. Cl. .................. 426/607; 554/141; 502/337

(58) Field of Classification Search ........... 426/607
See application file for complete search history.

(56) References Cited

U.S. PATENT DOCUMENTS

| | | | |
|---|---|---|---|
| 2,364,970 A | 12/1944 | Gwynn | |
| 2,985,674 A | 5/1961 | McGuine et al. | |
| 3,687,989 A | 8/1972 | Baltes | |
| 3,787,511 A | 1/1974 | Johnson | |
| 4,134,905 A | 1/1979 | Hasman | |
| 4,161,483 A | 7/1979 | Cahen | |
| 4,169,843 A | 10/1979 | Snyder | |
| 4,209,547 A | 6/1980 | Scarpiello et al. | |
| 4,234,618 A | 11/1980 | Jasko et al. | |
| 4,260,643 A | 4/1981 | Cochran | |
| 4,260,839 A | 4/1981 | Chen et al. | |
| 4,282,163 A | 8/1981 | Suzuki et al. | |
| 4,430,350 A | 2/1984 | Tresser | |
| 4,501,764 A | 2/1985 | Gercama et al. | |
| 4,533,561 A | 8/1985 | Ward | |
| 4,547,319 A | 10/1985 | Qualeatti | |
| 4,567,056 A | 1/1986 | Schmidt | |
| 4,629,716 A | 12/1986 | Kemp | |
| 4,847,016 A | 7/1989 | Gobel | |
| 4,855,273 A | 8/1989 | Pohl et al. | |
| 4,880,524 A | 11/1989 | Kemp | |
| 4,982,020 A | 1/1991 | Carduck et al. | |
| 5,039,544 A | 8/1991 | Lansbergen et al. | |
| 5,077,077 A | 12/1991 | Suzuki et al. | |
| 5,194,281 A | 3/1993 | Johnston et al. | |
| 5,215,779 A | 6/1993 | Dake et al. | |
| 5,371,254 A | 12/1994 | Lidert | |
| 5,407,695 A | 4/1995 | Wheeler et al. | |
| 5,434,278 A | 7/1995 | Pelloso et al. | |
| 5,470,598 A | 11/1995 | Scavone | |
| 5,504,231 A | 4/1996 | Guskey | |
| 5,734,070 A | 3/1998 | Tacke et al. | |
| 5,959,131 A | 9/1999 | Blaurock et al. | |
| 6,004,611 A | 12/1999 | Gotoh et al. | |
| 6,022,577 A | 2/2000 | Chrysam et al. | |
| 6,033,703 A | 3/2000 | Roberts et al. | |
| 6,147,235 A | 11/2000 | Helminen et al. | |
| 6,228,414 B1 | 5/2001 | Villagran et al. | |
| 6,238,926 B1 | 5/2001 | Liu et al. | |
| 6,261,628 B1 | 7/2001 | Howie | |
| 6,265,596 B1 | 7/2001 | Harrod et al. | |
| 6,391,369 B1 | 5/2002 | Kincs et al. | |
| 6,395,323 B2 | 5/2002 | Martinez-Serna | |
| 6,436,459 B2 | 8/2002 | Martinez-Serna | |
| 6,620,904 B2 | 9/2003 | Lemke | |
| 6,846,772 B2 | 1/2005 | Lok et al. | |
| 7,169,430 B2 * | 1/2007 | Higgins | 426/607 |

FOREIGN PATENT DOCUMENTS

| CA | 1270494 | 6/1990 |
|---|---|---|
| GB | 2 292 949 B | 3/1996 |
| WO | WO 03/080779 A1 | 10/2003 |

OTHER PUBLICATIONS

International Search Report for PCT/US 03/40494 with International Filing Date of Dec. 19, 2003.

Erickson, et al., "Handbook of Soy Oil Processing and Utilization", American Soybean Association and American Oil Chemists' Society, 1992.

(Continued)

Primary Examiner—Carolyn A Paden
(74) Attorney, Agent, or Firm—Cook Alex Ltd.

(57) ABSTRACT

Shortening systems are prepared which include hydrogenated edible oils that are hydrogenated in a manner to minimize the formation of trans-stereoisomers. A conditioned catalyst is used which disfavors trans-stereoisomer formation without significantly negatively impacting the length of time required to form solids for a useful shortening base stock through hydrogenation. Preferred conditioning agents are organic acid phosphates and phosphoric acid, In a preferred embodiment, a confectionary shortening is provided which incorporates a polyglycerol ester emulsifier.

30 Claims, No Drawings

OTHER PUBLICATIONS

Hydrogenation of Fats and Oils, AOCS Press, pp. 62, 63, 78, 79, 108; 1994.
SEPPIC Trade Sheet, Glycerophosphoric Acids, Nov. 1998.
High Performance Catalysts for Oleochemicals, Synetix Trade Sheet, circa. 2000.
Givaudan-Lavirotte Trade Sheet, 50% Liquid Glycerophosphoric Acid, Sep. 6, 2000.
Englehard Trade Sheet, Fats & Oils Catalysts, faxed Apr. 22, 2004, circa 2002.

* cited by examiner

LOW TRANS-STEREOISOMER SHORTENING SYSTEM

CROSS REFERENCE TO RELATED APPLICATION

This application is a continuation of application Ser. No. 10/352,692, filed Jan. 28, 2003 now U.S. Pat No. 7,169,430, which is hereby incorporated herein by reference.

BACKGROUND OF THE INVENTION

1. Field of the Invention

This invention generally relates to shortening systems and finds special application in confectionary shortenings such as those incorporated into icings and cake batters. More particularly, the invention is directed to shortening systems having a fat component which is selectively hydrogenated so as to exhibit a very low level of trans-stereoisomers. The shortening systems can include an emulsifier of a polyglycerol ester type.

2. Description of Related Art

An important consideration for some shortenings, and especially confectionary shortenings, is that they may be hydrogenated so that the melting point of the fat is high enough to avoid running or bleeding or melting at temperatures so low that handling is made difficult or the food becomes sticky. In many shortening or fat system applications, hydrogenation is required in order to provide fats or shortenings that exhibit needed physical properties, especially at differing temperatures at which the products are intended to be used.

One present concern regarding hydrogenated fats is that most hydrogenation approaches result in a relatively high trans-stereoisomer content. In some circles, there is a concern that trans-isomers pose a health risk not associated with hydrogenation per se, but with the presence of substantial trans-stereoisomer configuration content within the hydrogenated fat. Accordingly, if one wishes to minimize the presence of trans-isomers in confectionary products, hydrogenation should be limited. Yet, limited hydrogenation often will not provide the melt characteristics and mouth feel needed for confectionary systems.

Scavone U.S. Pat. No. 5,470,598, which is incorporated by reference hereinto, describes all-purpose shortening which is said to have reduced levels of trans fatty acids. This is achieved largely by incorporating base oils having very low trans fatty isomers in combination with certain beta-prime hard stock comprising a combination of a triglyceride of palmitic and stearic acid with a particular configuration of stearyl and palmityl groups, together with a triglyceride of palmitic and stearic acid with palmitic and stearic acid groups occupying certain positions, Requiring these types of sophisticated fat structures is not a suitable solution for most high-volume applications This patent also suggests incorporating beta prime compatible emulsifiers including polyglycerol esters of fatty acids having fatty acids of 12 to 22 carbon chain lengths.

Roberts et al, U.S. Pat. No. 6,033,703, incorporated by reference hereinto, also relates to all-purpose shortening having reduced levels of trans fatty acids. This is said to be accomplished with an edible oil having very low levels of trans fatty acids combined with a hard stock blend of beta prime phase tending hard stock components, together with an emulsifier, while including inert gas injection during processing.

Harrod et al. U.S. Pat. No. 6,265,596, incorporated by reference hereinto, teaches partially hydrogenating fats which have a low content of trans fatty acids. The approach of this patent is to combine the fat, hydrogen gas and a solvent which dissolves the fat and the product as much as possible. This is called a super-critical process and is carried out in the presence of a palladium catalyst or a nickel catalyst. A typical solvent for this approach is a hydrocarbon such as propane.

Chrysam et al. U.S. Pat. No. 6,022,577, incorporated by reference hereinto, relates to fat products which can have low trans content An interesterified blend is practiced, such as a random interesterification of a hysteric stearic acid soybean oil blend.

Hasman U.S. Pat. No. 4,134,905, incorporated hereinto by reference, discloses a time-consuming two-step approach for preparing trans acid restricted hard butters. The first step is hydrogenating with copper-chromite catalyst, with the second step being hydrogenation with a more-conventional catalyst, typically a nickel catalyst.

Chaen U.S. Pat. No. 4,161,483, incorporated by reference hereinto, describes a hydrogenation process which is said to reduce the formation of trans-isomers and/or conjugated dienes and/or saturated compounds. This proposes carrying out the hydrogenation in the presence of a nickel catalyst and an organic nitrogen-containing basic compound such as urea, hexamethylenetetramine and aliphatic amines.

Villagran et al. U.S. Pat. No. 6,228,414, No. 6,395,323 and No. 6,436,459 relate to low-fat snacks which incorporate a variety of polyglycerol ester compounds as emulsifiers in low-fat snack compositions. The subject matter of each of these patents is incorporated by reference hereinto.

These various approaches have limited applicability in achieving efficient hydrogenation of commodity-type fat sources while forming minimum levels of trans-stereoisomers. Many are expensive and/or difficult to manage in large-scale industrial production contexts. Nor is there a teaching of emulsifiers which are especially suitable for low-trans confectionary shortening systems.

SUMMARY OF THE INVENTION

In accordance with the present invention, confectionary shortenings are prepared to have a low level of trans-stereoisomer content. One method of carrying out the invention provides a nickel catalyst having a plurality of its reactive sites deadened or poisoned by a catalyst conditioning chemical. An edible fat source is hydrogenated in the presence of this catalyst so as to provide hydrogenated edible fat having not more than about 10 percent of trans-hydrogenation. In a preferred embodiment, an emulsion is formed with this low trans hydrogenated edible fat and a polyglycerol ester emulsifier. A low trans-stereoisomer containing confectionary icing and/or cake batter shortening is thus provided.

A general object and/or aspect of the present invention is to provide an improved method for preparing a confectionary shortening having a low level of trans-stereoisomer, and the confectionary shortening thus produced.

Another object and/or aspect of the present invention is to provide an improved method and product wherein low trans-hydrogenation is carried out without substantially increasing the length of time required to prepare solids for a shortening base stock.

Another object and/or aspect of this invention is to provide an improved confectionary shortening having a very low level of trans-stereoisomer locations by using a hydrogenation catalyst which is advantageously and selectively poisoned to reduce trans-isomer formation without greatly reducing hydrogenation reaction speed.

Another object and/or aspect of the present invention is to provide an improved method for preparing confectionary shortenings having low levels of trans-isomers and achieving same without detrimental darkening and/or off-flavor formation, upon deodorization.

Other aspects, objects, features and advantages of the present invention will be apparent from and clearly understood through a consideration of the following detailed description.

DESCRIPTION OF THE PREFERRED EMBODIMENTS

Vegetable oils are processed in accordance with the present invention in order to transform them into confectionary shortenings having very low levels of trans-stereoisomers. It is an important aspect of the invention that the vegetable oil be hydrogenated in the presence of a particular type of catalyst. In the preferred embodiment, this catalyst is prepared by conditioning same, or by another approach which imparts a specified structure to it. Herein, such catalysts are referred to as conditioned catalysts The conditioned catalyst is provided at usual catalyst incorporation levels.

Advantageously, the vegetable oil starting material can be a commodity-type of edible oil, or a common domestic vegetable oil. No special oil starting material is required. There is no need for oils that have a particular property which is required for disfavoring trans formation. Included are soybean oil, canola or rapeseed oil, corn oil, safflower oil, sunflower oil, cottonseed oil, and the like. In addition, the process is tolerant to reasonable variations in the quality or specific parameters of the starting oil material.

The starting oil is subjected to a controlled hydrogenation procedure which strongly disfavors the formation of trans-stereoisomers. The controlled hydrogenation strongly favors cis-stereoisomers at the hydrogenation site.

Quantification of the extent of trans-stereoisomerization associated with the invention is in accordance with the commonly used analytical technique which is a standard American Oil Chemist Society (AOCS) method. In this analytical technique, there is a conversion from triglycerides to methyl esters which are analyzed by gas chromatography. The "percent trans" values reported herein are the percent of area of the chromatogram peaks which are associated with a trans configuration and which, within the error of this AOCS technique, sum to 100 percent of the fatty acids present. This percent value is not fully equivalent to weight percent. Weight percent on a fat basis would be somewhat less than this AOCS technique percentage, due primarily to the contribution of the glycerine portion of the molecule to the total weight of the fat.

In accordance with this AOCS analysis, the quantity of trans-stereoisomers present after the controlled hydrogenation according to the invention is less than about 10 percent. Preferably, the percentage of trans sites is not greater than about 6 percent, most preferably not greater than about 4 percent.

A primary factor in achieving this controlled hydrogenation is the catalyst used during the hydrogenation procedure. The catalyst is a nickel catalyst. It can be of a narrow pore type, narrow porosity being a structure generally known in the art. The catalysts of the invention have properties such that the catalyst favors saturate formation. Such a catalyst has been conditioned so as to be less active than before conditioning. The conditioning basically is carried out by subjecting the catalyst to a conditioning chemical as discussed herein.

At present, the conditioning mechanism is not explicitly understood. In the interests of disclosing information currently known, the following possible conditioning mechanisms are noted. One mechanism is that the conditioning chemical modifies the catalyst so that no or minimal active sites remain on the surface of the catalyst and it has a network of narrow pores which are active catalyst sites. A catalyst having this structure means that the reaction is almost exclusively within the narrow pores.

An alternative possible mechanism is that the conditioning chemical could be exerting its influence on the nickel catalyst by partially blocking pores, thereby slowing diffusion of the triglycerides into and away from the active sites. This has the potential of having an even greater impact on disfavoring trans-stereoisomer formation than does the actual elimination of active sites.

Another alternative possible mechanism is that the conditioning chemical interacts with the support material for the finely dispersed metal of the catalyst. This interaction would be what impacts on the course of the reaction during hydrogenation. Of course, a combination of these possible mechanisms could be occurring.

Whatever the actual mechanism at work, which even could vary depending upon the particular catalyst structure and properties, it has been found that conditioned catalysts as discussed herein are very important to the very low trans fatty acid production which is characteristic of the present invention.

Catalysts of this type which effect the controlled hydrogenation described herein preferably are prepared by conditioning existing nickel catalysts This conditioning involves subjecting a nickel catalyst to a conditioning chemical such that catalyst is rendered less active.

Suitable conditioning chemicals are selected from the group consisting of organic acids, nitrogenous bases, phosphoric acids and organic acid phosphates A particularly preferred conditioning chemical is phosphoric acid, such as 75 percent food grade acid. The conditioning chemical can be provided in the form of phosphated mono-and di-glycerides. When provided in this latter form, the conditioning chemical and the catalyst are combined at a ratio of between about 0.1 to 1 and about 0.3 to 1. Preferably, this ratio is between about 0.15 to 1 and about 0.25 to 1.

Referring further to the phosphated mono- and di-glycderides, it is preferred that the phosphated mono- and di-glyceride mixture be one, which is not substantially neutralized. In order for this to be adequately active, it can be unneutralized material, or it can be very slightly neutralized. Hereinafter, the adequately active conditioning chemicals of this type are referred to as "substantially unneutralized phosphated mono- and di-glycerides." It will be understood that this can encompass the mixtures which are partially neutralized mono- and di-glycerides, as well as mixtures used as prepared by distilling monoglyceride and then phosphating same into the phosphated mono- and di-glyceride mixture.

Preferably, the nickel catalyst is a narrow pore catalyst. Catalysts of this type include Nysofact® or other industrial catalysts suitable for use in the edible oil industry. Other narrow pore nickel catalysts include the Synetix 9912 catalyst Other catalysts include those within the Nysosel line of nickel catalysts available from Englehard.

The conditioned catalyst composition preferably is combined in a slurry tank or the like. When the conditioned catalyst is formed by combining the nickel catalyst with the conditioning chemical, the interaction therebetween, such as within the slurry tank, typically will proceed for at least about one half an hour, and generally no longer than about one hour and one half. The conditioned catalyst is charged into the hydrogenation or cooking vessel having the edible oil to be subjected to hydrogenation. The conditioned catalyst charge is at a level of about 0.015 to about 0.025 weight percent, based upon the total weight of the charge into the hydrogenation vessel.

Hydrogenation is carried out in equipment generally known in the art. Such hydrogenation takes place at an elevated temperature and an elevated pressure. A typical temperature range is between about 260° F. and about 280° F. (about 127° C. to 138° C.). A typical hydrogenation pressure is between about 40 psig and about 50 psig.

In making a typical all purpose shortening, the hydrogenated oil having low trans levels is blended with edible oil flake at a level of between about 7 weight percent and about 15 weight percent, based upon the total weight of the blended shortening. Hardened edible oil products, such as cottonseed flake, can be used.

In accordance with usual practice, this shortening blend is deodorized at an elevated temperature. With the invention, deodorization can advantageously be carried out at a temperature somewhat lower than for most deodorizations, Typically, the deodorization can be carried out at between about 470° F. and about 490° F. (between about 243° C. and about 254° C.). The deodorized all purpose shortening can be shaped and packaged as desired. For example, the shortening may be made up into 50 pound cubes or other conventional shortening form.

Preferably, the low trans hydrogenated oil is combined with edible oil hard stock and deodorized, as discussed above, and then made into a confectionary shortening. In doing this, the deodorized shortening is combined with an emulsifier and also typically with monoglycerides and made up into confectionary shortening which is a low trans icing and cake batter shortening. An especially preferred emulsifier is of the polyglycerol fatty acid ester type, or a PGE.

When present, monoglycerides are at a level of at least 0.25 weight percent, based upon the total weight of the shortening system. A typical upper addition level is to about 1.25 weight percent. Preferably, when present, the monoglyceride is at a level of between about 0.5 weight percent and about 1.0 weight percent, based on the total weight of the shortening system.

Emulsifier content depends somewhat on the properties of the particular chosen emulsifier and whether or not any other components are included, such as monoglycerides. When no monoglycerides are present, acceptable cake shortening is provided with between about 1.3 and about 1.5 weight percent PGE emulsifier, based on the total weight of the shortening system. Without monoglycerides, acceptable icing shortening is provided with between about 1.5 and about 1.7 weight percent PGE emulsifier, based on the total weight of the shortening system. When monoglycerides or equivalents are included, a typical range for the PGE emulsifier content is between about 0.7 weight percent and about 1.2 weight percent of the shortening system. When the especially preferred polyglycerol esters noted herein are used, such typically are present at a level of between about 0.8 weight percent and about 1 weight percent, most preferably between about 0.85 weight percent and about 0.98 weight percent, based on the total weight of the shortening system.

Polyglycerol fatty acid ester emulsifiers of the especially preferred type are made from glycerol that was polymerized to average from 3 to 4 units long. The fatty acids of the PGE emulsifier can be from either a shortening or from a palm fraction. Other sources of fatty acids can be substituted.

The average degree of esterification ranges from 1 to 2 fatty acids per polyglycerol molecule. The polyglycerol units are formed by a conventional process which allows the production of considerable amounts of cyclic compounds Preferably, the polyglycerol units are formed by a process that produces substantially all non-cyclic forms of such compounds. Emulsifiers of this latter type are available from Lonza as linear PGE's. The emulsifier can be a linear polyglycerol fatty acid ester emulsifier that was esterified to average from 3 to 4 units in length, and the average degree of esterificationis between 1 and 2 fatty acids per polyglycerol molecule.

In the following Examples, specific embodiments are presented in order to provide further disclosure of relevance to the present invention.

EXAMPLE 1

Domestic edible oil samples were subjected to hydrogenation both in accordance with an embodiment of the present invention and in accordance with other, comparative approaches. In some approaches, different catalyst conditioning chemicals were used in an attempt to deaden a narrow pore nickel catalyst. In another approach, attempts were made to lessen trans-stereoisomer formation by carrying out the hydrogenation with very low levels of catalyst.

A nickel narrow pore catalyst was poisoned with lecithin to provide a nickel catalyst slurry. This was added as a reactant charge, together with domestic edible oil, into a hydrogenation unit, followed by deodorization in accordance with good manufacturing practice within the industry. The resulting all-purpose shortening was unacceptably darkened, serious off-flavors developed, and trans-stereoisomer production was greater than that according to the present invention, Other poisoning agents were evaluated in much the same manner. The poisoning agents included soaps, oxidized cottonseed oil, chlorophyll and other contact poisons. These experienced a variety of oil quality problems and none were found to be as effective as an acid organic phosphate in achieving hydrogenation with trans-stereoisomer levels as low as those of the present invention.

An attempt was made to achieve low trans-stereoisomer levels by using a narrow pore nickel catalyst at a very low level of the reactant charge into the hydrogenation chamber. While reasonable trans-stereoisomer reduction was achieved, the length of time required to form adequate solids for a useful shortening base stock was seriously extended to times not acceptable for commercial hydrogenation. With this reduced-catalyst amount approach, the reaction time was at least two times longer, and as much as five times longer, than reaction times achievable with the present invention. This illustrates that, with the invention, excellent reduction in the formation of trans-stereoisomers during hydrogenation is achieved without incurring the substantial extra costs associated with very long lengths of time to form solids for a useful shortening base stock through hydrogenation.

EXAMPLE 2

A narrow pore nickel catalyst, Nysofact® 120 catalyst, was placed into a slurry tank, a total of 9 pounds having been added. Also added to the slurry tank was 1.85 pounds of phosphated mono-and di-glycerides. Slurry development proceeded for approximately 45 minutes. The resulting conditioned catalyst was charged, together with 60,000 pounds of base soybean oil, into an industrial-type hydrogenation or cooking vessel. Hydrogenation was carried out for 52 minutes, the hydrogen gas pressure being 45 psig. The refractive index measurement at 60.0 c on the butyro scale was 48.9. The hydrogenation cooking temperature was 270° F. (132° C.) at the end of the hydrogenation. The total hydrogen gas count was 149 scf. The trans-stereoisomer analysis is about 4 percent.

EXAMPLE 3

Into a catalyst slurry tank was added 9 pounds of Nysofact® 102 narrow pore nickel catalyst, together with 1.85 pounds of phosphated mono-and di-glycerides conditioning chemical. After conditioning proceeded for approximately 1 hour, the conditioned catalyst was charged, together with 60,000 pounds of base soybean oil, into an industrial-type hydrogenation unit. The hydrogen gas pressure was 45 psig, with the hydrogen gas count being 235 scf, with the reaction time being 50 minutes from the start of gas flow. The refractive index measurement was 49.2 at 60.0 c on the butyro scale. The resulting hydrogenated oil was found to contain less than 4 percent trans-stereoisomer.

EXAMPLE 4

Low-trans hydrogenated oil prepared in accordance with Example 3 was blended with cottonseed hard stock, with 75,000 pounds of the hydrogenated oil being blended with 9,000 pounds of the hard stock. Of the resulting total 84,000 pounds, 11 weight percent was cottonseed hard stock. Deodorization then was carried out in accordance with industrial-type practice but at a generally lower temperature so as to prevent trans-stereoisomer formation in significant amounts during deodorization. The temperature was kept at about 480° F. (249° C.). 34,900 pounds of the deodorized shortening was passed through a Votator and formed into multiple 50-pound cubes of all-purpose shortening. The trans-stereoisomer content was about 4.1 percent.

EXAMPLE 5

Base oil hydrogenated in accordance with Example 3 was blended with cottonseed hard stock to provide a shortening product having 11 percent by weight cottonseed hard stock, This was deodorized at 480° F. (249°), and 38,200 pounds of the deodorized low trans-stereoisomer shortening was formed into a confectionary shortening. Same was combined with 351.14 pounds of Lonza® linear polyglycerol ester emulsifier, together with 292.16 pounds of monoglycerides. The resulting combination was passed through a Votator to form 50-pound cubes of confectionary shortening having a trans-stereoisomer content of 3.5 percent. This confectionary shortening was successfully used to make acceptable icing and cake products.

EXAMPLE 6

Hydrogenated base oil having 6 percent or less of trans fatty acids was made up into three different confectionery shortening systems In each case, a linear PGE emulsifier of Lonza was used, with or without a monoglyceride.

Using the linear PGE emulsifier at 1.35 weight percent, based on the total weight of the shortening system, and without adding any monoglyceride added to the shortening system, resulted in an acceptable confectionary cake shortening, but using same as an icing shortening resulted in inadequate aeration of the icing.

Using the linear PGE emulsifier at 1.6 weight percent, based on the total weight of the shortening system, and without any added monoglyceride, resulted in an acceptable confectionary icing shortening, but using same as a cake shortening resulted in failure of the cakes because the cake batter was over emulsified In the formulation which contained both the linear PGE emulsifier and monoglycerides, the same shortening system was suitable for making both icing and cakes This shortening system contained 0.9 weight percent of the PGE and 0.75 weight percent of the monoglycerides, both based on the total weight of the shortening system. It was judged that this low trans-stereoisomer shortening system was comparable to cake and icing shortening systems containing fats having about 25 percent of trans-stereoisomer.

It will be understood that the embodiments of the present invention which have been described are illustrative of some of the applications of the principles of the present invention. Numerous modifications may be made by those skilled in the art without departing from the true spirit and scope of the invention.

The invention claimed is:

1. A method of preparing a low trans-stereoisomer shortening system, comprising:
   selecting an edible oil source comprising a vegetable oil;
   providing a nickel catalyst having a plurality of active catalysis sites that are conditioned with a conditioning chemical comprising an organic acid phosphate for a period of time adequate to render the catalyst less active than it had been prior to being conditioned with the conditioning chemical in order to provide a conditioned catalyst composition;
   hydrogenating said edible oil source in the presence of said conditioned catalyst composition to provide a hydrogenated edible fat having a trans-stereoisomer fatty acid content of not more than about 10 percent; and
   deodorizing said hydrogenated edible fat and collecting same as an edible shortening.

2. The method in accordance with claim 1, wherein said conditioning chemical and said nickel catalyst are combined at a weight ratio of between about 0.1 to 1 and about 0.3 to 1.

3. The method in accordance with claim 2, wherein the ratio is between about 0.15 to 1 and about 0.25 to 1.

4. The method in accordance with claim 2, wherein said hydrogenating provides a hydrogenated edible fat having a trans-stereoisomer content of not more than about 6 percent.

5. The method in accordance with claim 2, wherein said hydrogenating provides a hydrogenated edible fat having a trans-stereoisomer content of not more than about 4 percent.

6. The method in accordance with claim 1, wherein said hydrogenating provides a hydrogenated edible fat having a trans-stereoisomer content of not more than about 6 percent.

7. The method in accordance with claim 1, wherein said hydrogenating provides a hydrogenated edible fat having a trans-stereoisomer content of not more than about 4 percent.

8. The method in accordance with claim 1, further including adding between about 7 and about 15 weight percent of a vegetable fat hard stock prior to said deodorizing.

9. The method in accordance with claim 1, further including combining the hydrogenated edible fat with a polyglycerol ester emulsifier thereby providing a low trans-stereoisomer confectionary shortening suitable for use in confectionary icings and cake batters.

10. The method in accordance with claim 9, wherein said emulsifier is a linear polyglycerol fatty acid ester which is added at a level of between about 0.8 weight percent and about 1.0 weight percent, based upon the total weight of the confectionary shortening.

11. The method in accordance with claim 10, further including adding a monoglyceride with said polyglycerol, said monoglyceride being added at between about 0.25 to about 1.25 weight percent, based on the total weight of the confectionary shortening.

12. The method in accordance with claim 1, wherein said deodorizing is carried out at a temperature of between about 470° F. and about 490° F. (243° C. to about 254° C.).

13. The method in accordance with claim 1, wherein said catalyzing proceeds for between about 30 minutes and about 90 minutes.

14. The method in accordance with claim 1, wherein said contacting combines between about 15 and about 20 weight percent of said conditioning chemical with said nickel catalyst, based upon the total weight of the catalyst and conditioning chemical.

15. A method of preparing a low trans-stereoisomer containing shortening system, comprising:
    selecting an edible oil source comprising a vegetable oil;
    providing a narrow pore selective nickel catalyst composition having a plurality of active sites which are conditioned with a conditioning chemical comprising an organic acid phosphate;
    hydrogenating said edible oil source in the presence of said selective catalyst to provide a hydrogenated edible fat having not more than about 10 percent trans-stereoisomer fatty acid content; and
    incorporating said hydrogenated edible fat into a shortening system to provide a shortening system having not more than about 10 percent trans-stereoisomer content.

16. The method in accordance with claim 15, wherein the conditioning chemical and said catalyst are combined at a weight ratio of between about 0.1 to 1 and about 0.3 to 1.

17. The method in accordance with claim 15, wherein said hydrogenating provides a hydrogenated edible fat having not more than about 4 percent trans-stereoisomer content.

18. The method in accordance with claim 15, further including combining the hydrogenated edible fat with a polyglycerol ester emulsifier thereby providing a low trans-stereoisomer containing confectionary shortening suitable for use in either or both of confectionary icings and cake batters.

19. The method in accordance with claim 15, wherein said polyglycerol ester emulsifier is a linear polyglycerol fatty acid ester added at between about 0.8 and about 1.7 weight percent of said emulsifier, based upon the total weight of the shortening system, and a monoglyceride is added at between 0 and about 1.25 weight percent of said monoglyceride, based on the total weight of the shortening system.

20. The method in accordance with claim 19, wherein said emulsifier is added at a level of between about 0.8 weight percent and about 1.0 weight percent, based upon the total weight of the confectionary shortening.

21. The method in accordance with claim 15, wherein said hydrogenation provides a hydrogenated edible fat having a trans-stereoisomer content of not more than about 6 percent.

22. A method of processing a catalyst for preparing a low trans-stereoisomer containing edible fat, comprising:
    providing a narrow pore nickel catalyst for hydrogenating an edible oil, said catalyst having a plurality of active sites;
    contacting said catalyst with a conditioning chemical selected from the group consisting of a phosphoric acid, an organic acid phosphate, and combinations thereof for a period of time adequate to deaden a majority of said active sites of the catalyst in order to provide a conditioned catalyst; and
    said conditioned catalyst controls trans-stereoisomer formation in an edible fat while hydrogenerating same in order to achieve a trans-stereoisomer content of not more than about 10 percent.

23. The method in accordance with claim 22, wherein said conditioning chemical and said narrow pore nickel catalyst are combined at a weight ratio of between about 0.15 to 1 and about 0.25 to 1.

24. The method in accordance with claim 23, wherein said conditioned catalyst controls the trans-stereoisomer content to be not more than about 4 percent.

25. The method in accordance with claim 23, wherein said ratio is between about 0.01 to 1 and about 0.3 to 1.

26. The method in accordance with claim 22, wherein said contacting combines between about 15 and about 20 weight percent of said conditioning chemical with said catalyst, based upon the total weight of the catalyst and conditioning chemical.

27. The method in accordance with claim 22, wherein said conditioned catalyst controls the trans-stereoisomer content to be not more than about 6 percent.

28. The method in accordance with claim 22, wherein said conditioned catalyst controls the trans-stereoisomer content to be not more than about 4 percent.

29. The method in accordance with claim 22, wherein said conditioning chemical comprises phosphated mono- and diglycerides.

30. The method in accordance with claim 22, wherein said conditioning chemical comprises an organic acid phosphate.

* * * * *